April 21, 1931.  J. T. ZELLERS  1,801,298
SHEET GLASS DRAWING APPARATUS
Filed March 31, 1928
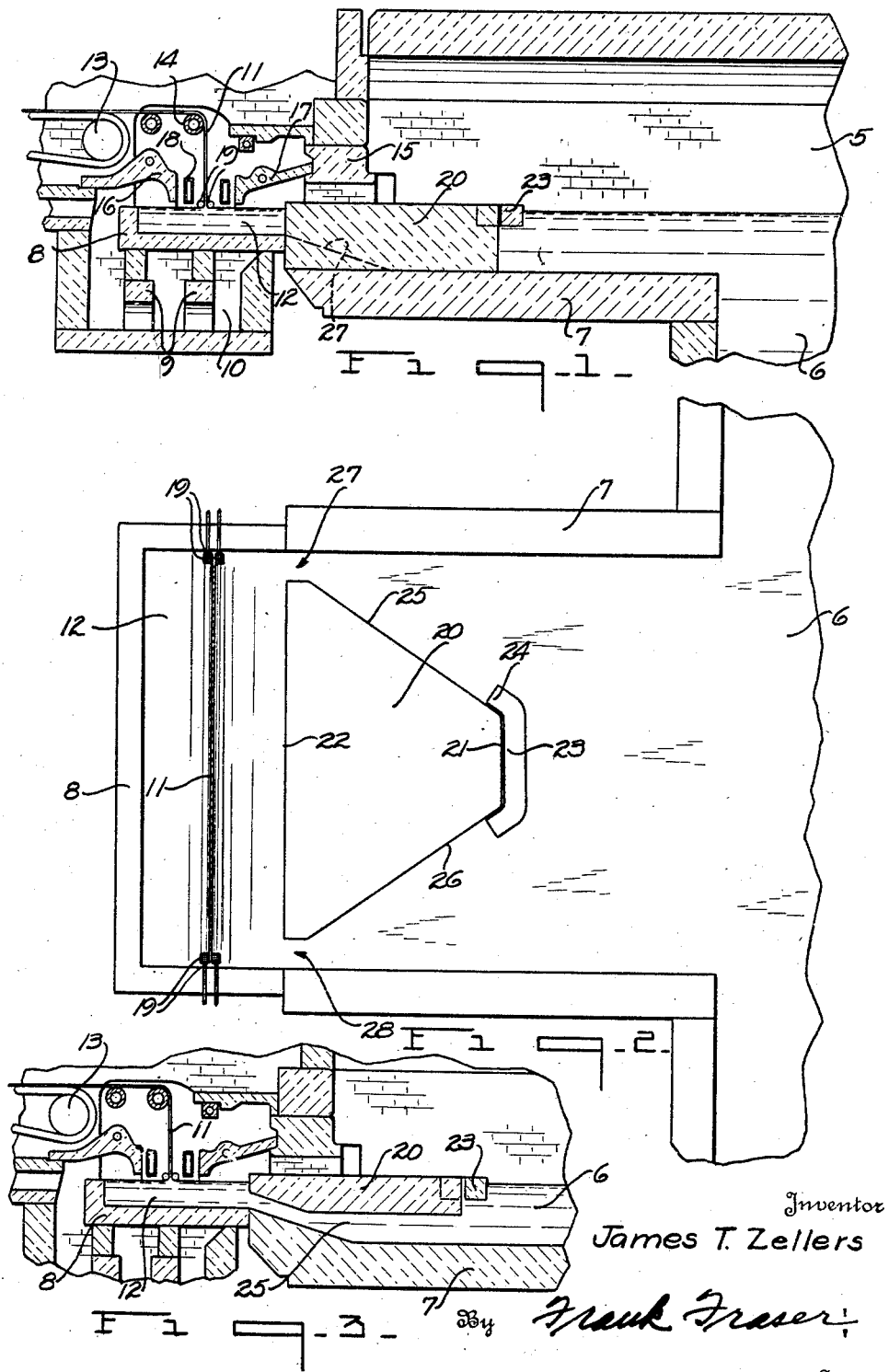
Inventor
James T. Zellers
By Frank Fraser
Attorney Patented Apr. 21, 1931

1,801,298

UNITED STATES PATENT OFFICE

JAMES T. ZELLERS, OF SHREVEPORT, LOUISIANA, ASSIGNOR TO LIBBEY-OWENS-FORD GLASS COMPANY, OF TOLEDO, OHIO, A CORPORATION OF OHIO

SHEET-GLASS-DRAWING APPARATUS

Application filed March 31, 1928. Serial No. 266,122.

This invention relates to improvements in the art of producing sheet glass and is primarily designed for and finds its greatest utility when incorporated in a glass tank furnace of the type generally employed in the Colburn process for drawing sheet glass although it is of course not necessarily restricted to use in such connection.

In the Colburn system for drawing sheet glass as shown for example in the patent to I. W. Colburn 1,248,809 granted Dec. 4, 1917, the glass producing materials are melted in one end of a rather long tank furnace, the molten glass flowing slowly through the melting and refining portions of the furnace to the opposite end thereof where the surface glass flows in the form of a relatively thin stream or body into a shallow receptacle from which the sheet is drawn. Suitable sheet width maintaining means preferably in the form of knurled rolls are adapted to engage opposite sides of the sheet at both edges thereof and preferably adjacent its base to prevent the drawn sheet from narrowing. These rolls, as ordinarily used, tend to form thickened knurled edges on the sheet and which edges are subsequently trimmed off, usually subsequent to the annealing operation.

Heretofore, it has been customary for the glass to flow from the furnace into the shallow receptacle in the form of a relatively thin stream or body, said stream being of a width substantially equal to that of said receptacle. An important object of the present invention is to provide an improved system for feeding the molten glass from the furnace to the relatively shallow receptacle or pot from which the sheet is drawn whereby to improve the quality of the sheet produced. As herein exemplified, this may be accomplished by diverting the flow of the surface glass in the furnace from its normal course and causing it to enter the shallow receptacle or draw pot at the sides thereof only rather than across its entire width. In this manner, the glass will be delivered into the draw pot at the sides thereof adjacent the width maintaining means or knurled rolls and by diverting the flow of surface glass (which usually contains the principal defects in the glass) toward the knurled rolls or sides of the draw pot, said defects will be concentrated and diverted to the knurled rolls and will thus be drawn into the edges of the sheet instead of being spread all across the receptacle, in which event they would be drawn into the main body of the sheet. Also, feeding the flow of glass into the draw pot at the sides rather than to the center thereof will tend to deliver hotter glass to the knurled rolls which should result in producing better and thinner knurled edges on the sheet as well as reducing devitrification of the glass at this point as well as throughout the entire pot.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through sheet glass drawing apparatus constructed in accordance with the present invention.

Fig. 2 is a top plan view thereof, and

Fig. 3 is a view similar to Fig. 1 but showing a slightly modified construction.

Referring now to the drawings 5 indicates the refining end of a continuous tank furnace containing a mass of molten glass 6. This molten glass is first produced in the melting end of the furnace not here shown but being at the right of Fig. 1, the glass then flowing slowly through the furnace to the refining portion 5 and thence into the smaller and somewhat shallower so-called cooling chamber 7. From the cooling chamber 7 the glass flows into the still shallower working receptacle or draw pot 8 herein shown as being supported upon stools 9 above a heating chamber 10. The glass sheet 11 is continuously drawn upward from the surface of the molten glass 12 in receptacle 8 by means of suitable drawing mechanism 13, the sheet being preferably drawn initially in a generally vertical direction and subsequently deflected into the horizontal plane about a suitable bending member or roll 14. Obviously, however, the sheet may be continued vertically if desired.

From the cooling chamber 7 the glass flows under the jack-arch 15 into receptacle 8 and all of the surface glass in said receptacle except the comparatively narrow transverse strip from which sheet 11 is drawn upwardly is enclosed by the cover-tiles 16 and 17.

At each side of sheet 11 a hollow metallic water-cooled shield 18 may be placed with its lower edge closely adjacent the molten pool 12. These shields or coolers 18 serve to protect the sheet source from heated gases flowing out under the cover-tiles 16 and 17 and at the same time absorb heat from the surface glass which passes under the lower edges of the coolers, thus reducing this glass to the proper temperature to be drawn into sheet form.

Heretofore, the glass has ordinarily been permitted to flow from the cooling chamber 7 into the draw pot 8 in a body or stream extending substantially the entire width thereof with the result that any defects which were upon the surface of the molten glass would be spread across the entire width of the pot and be drawn upwardly into the body of the sheet. According to the present invention, however, the molten glass is caused to flow from the cooling chamber 7 into draw pot 8 in a novel and improved manner so as to concentrate the surface defects and divert them to and cause them to be drawn into the edges of the sheet instead of into the body thereof.

In carrying out the present invention and as shown particularly in Figs. 1 and 2, there is arranged within the cooling chamber 7 a flow diverting or dam member 20. This member is preferably positioned in the center of the cooling chamber 7 and rests upon the bottom thereof, said member consisting either of a single refractory slab or monolithic construction or being of built-up block construction as desired. The member 20 is substantially triangular in top plan with its smaller or narrower end 21 facing in the direction of the furnace while its wider forward end 22 is positioned at substantially the juncture of the cooling chamber 7 and draw pot 8 and substantially parallel with the line of formation of sheet 11.

Associated with the smaller end 21 of member 20 is a floater 23 having the bent end portions 24 engaging the member 20 to prevent accidental displacement of said floater. The floater 23 is adapted to be removable in order that it may be replaced when the same becomes worn or broken. While the floater 23 may be immersed within the molten glass throughout the entire depth of the cooling chamber 7, it has been herein shown as being immersed therein for only a slight distance. Such a construction is desirable in view of the fact that the floater need not be anchored in place and since the greatest wear or deteriorating effect upon the member 20 would be at the top thereof due, in part, to the more rapid movement of the surface glass.

The opposite side faces 25 and 26 of the member 20 diverge forwardly so as to cause the glass to flow toward the sides of the cooling chamber. The member 20 is spaced from the side walls of the cooling chamber a distance sufficient to create the relatively restricted passages 27 and 28 through which the glass flows into draw pot 8. These passages are substantially in line with the edges of the sheet so that the glass will enter the draw pot first about the position of the knurled rolls 19 and will then circulate or spread throughout the pot.

With the use of such a member as above described, the flow of glass through the cooling chamber will be diverted from its normal course and caused to flow to the opposite sides thereof and thence into the draw pot through passages 27 and 28. The central flow of glass through the cooling chamber is naturally somewhat hotter than are the border portions thereof and the diverting of the flow of glass into the sides of the draw pot rather than at the center thereof will tend to deliver this hot glass to the knurls thereby tending to reduce devitrification of the glass at this point and resulting in the production of better and thinner knurled edges on the sheet. Heretofore, in actual practice, the glass immediately adjacent the knurls has had a tendency to become devitrified rendering necessary the use of pipe burners or the like for remelting the same. These burners, however, have a tendency to produce seeds and blisters in the sheet. With the present construction, it is possible to eliminate all such burners so that the objectionable features incident to their use is avoided.

The construction shown in Fig. 3 is substantially the same as that shown in Figs. 1 and 2 the principal difference being that the block-work or slab 20 is maintained spaced from the bottom of the cooling chamber 7 so that only the surface glass (which, as stated above, contains the principal defects in the glass) is diverted to the knurled rolls or sides of the draw pot while the sub-surface glass is permitted to flow beneath the member as indicated at 25 into the pot 8 throughout the width thereof.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:—

1. In apparatus for producing sheet glass, a glass melting furnace adapted to contain a constantly moving body of molten glass, a working receptacle in communication with the furnace for receiving the molten glass therefrom, means immersed within the molten glass within the furnace at substantially the juncture thereof with the receptacle for diverting the flow of surface glass from the center of the furnace and causing it to enter said receptacle at the sides thereof only, and a removable floater member associated with said means.

2. In apparatus for producing sheet glass, a glass melting furnace adapted to contain a constantly moving body of molten glass, a draw pot in communication with the furnace for receiving the molten glass therefrom, means for drawing a sheet from the glass within the draw pot, means immersed within the molten glass within the furnace at substantially the juncture thereof with the draw pot for obstructing the flow of surface glass into the draw pot except at a point adjacent the edges of said sheet, said means being substantially triangular in top plan with its smaller end facing in the direction of the furnace, and a floater member removably associated with the smaller end of said means.

3. In apparatus for producing sheet glass, a glass melting furnace adapted to contain a moving body of molten glass, a working receptacle in communication with the furnace for receiving the molten glass therefrom, means immersed within the molten glass within the furnace and spaced from the bottom thereof for obstructing the flow of surface glass from the furnace into the receptacle except at the sides thereof only while allowing the sub-surface glass to flow into the receptacle throughout substantially the entire width thereof, and a removable floater member associated with said means.

4. In apparatus for producing sheet glass, a glass melting furnace adapted to contain a moving body of molten glass, a working receptacle in communication with the furnace for receiving the molten glass therefrom, a member immersed within the molten glass within the furnace and spaced from the bottom thereof for diverting the flow of surface glass from the center of the furnace and causing it to enter the receptacle at the sides thereof only while allowing the sub-surface glass to flow into the receptacle throughout substantially the entire width thereof, said member being substantially triangular in top plan with its smaller end facing in the direction of the furnace, and a floater removably associated with the smaller end of said member.

Signed at Toledo, in the county of Lucas and State of Ohio, this 22nd day of March, 1928.

JAMES T. ZELLERS.